April 28, 1970 N. E. PETERSON 3,509,455

FSK CIRCUIT ANALYZERS

Filed May 10, 1967

INVENTOR.
NORMAN E. PETERSON

BY
Norman N. Holland

ATTORNEY 3,509,455
FSK CIRCUIT ANALYZERS
Norman E. Peterson, Ridgefield, Conn., assignor to Digitech, Inc., Ridgefield, Conn., a corporation of Connecticut
Filed May 10, 1967, Ser. No. 637,547
Int. Cl. G01r 23/14
U.S. Cl. 324—79 8 Claims

ABSTRACT OF THE DISCLOSURE

A method and means for analyzing FSK communication circuits for obtaining a reading of the frequency drive of the signal frequencies from their preset frequencies. The analyzing system demodulates the signal for determining whether a mark or space frequency is being transmitted while applying the signal frequency to a frequency counter. The demodulated signal is also used to confine the frequency counting to periods spaced from the transitions of the signals between the mark and space frequencies to eliminate the inaccuracies which result from the transient conditions present during the transitions.

BACKGROUND OF THE INVENTION

The present invention is directed to providing a method and means for analyzing FSK signal circuits and to provide a reading of frequency deviations of the mark and space frequencies of one or more signals on a given frequency band. More particularly, the method and means are arranged to provide for a passive analysis of the FSK signals so that deviation readings can be obtained without interfering with or interrupting the normal traffic on the channel and by an automatic and continuous monitoring program.

Frequency shift keying is a common means for transmitting intelligence by coded mark and space signals where a carrier frequency has its frequency shifted between preset values for the mark and for the space signals. One or more such signals may be sent on a frequency band with each signal or channel being assigned distinct frequencies for its mark and space signals and with the various signals being filtered out at the receiver and separate demodulation.

The present practice for analyzing FSK signals and for checking the signal frequencies to assure that they remain accurate involves an interruption of the normal traffic and the measuring of the frequencies by frequency counters or otherwise while transmitting successive elongated mark and space signals. This is disadvantageous as it involves an interruption of the normal signal transmission. Significant frequency transients occur during the space and mark transitions which have previously discouraged the use of other analyzing techniques. The analyzing means in accordance with the present invention includes a demodulator for determining whether a mark or space frequency is being transmitted and it includes an additional timing device activated by transitions in the demodulated signal to obtain a count of the frequency of the signal frequency spaced from and thus not affected by spurious frequency variations occuring during the space and mark transition periods.

In the preferred method of analyzing the signal, a display of the signal deviation in cycles of deviation above or below the correct frequency is provided. This direct indication of frequency variation is immediately useful to maintenance personnel as it permits them to take corrective action if necessary without ascertaining what the particular carrier frequency involved is.

The apparatus and means of the present invention are useful in a manually operated system for periodic scheduled circuit analysis and the technique is also adaptable for an automatic system which may be sequentially switched to the various FSK channels in a band with the frequency deviations being displayed directly or on printed or hard-copy form. The latter techniques are particularly suitable for a programmed analysis where the recorded or read-out deviations may be compared with a preset channel threshold so that read-outs and corrective action need be taken only where the channel is experiencing significant and objectionable frequency variations.

Accordingly, an object of the present invention is to provide an improved method of and means for analyzing FSK circuits.

Another object of the present invention is to provide a method and means for passively analyzing circuits carrying FSK signals.

Another object of the present invention is to provide a method and means for analyzing FSK signals without interfering with normal traffic on the FSK circuits.

Another object of the present invention is to provide an FSK analyzing means suitable for continuous automatic mounting of several FSK channels and with a preprogrammed read-out or alarm system.

Another object of the present invention is to provide a means for analyzing FSK signals where the information is provided directly in cycles of frequency deviation and independently of the signal carrier frequency.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

DESCRIPTION OF THE PREFERRED EMBODIMENT

Figure 2:
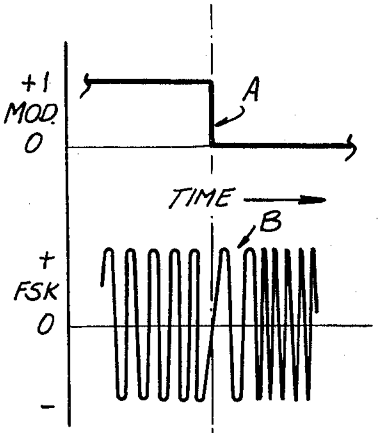
FIG. 2 is a diagrammatic illustration of an FSK carrier and the modulating signal.

Frequency shift keying or FSK signal transmission is in common use for transmitting intelligence encoded in mark and space code groups and where a signal carrier frequency is shifted between a mark frequency and a space frequency as illustrated diagrammatically in FIG. 2 where the coded or demodulated signals are illustrated at A and where a modulated carrier is illustrated at B with the frequency variations exaggerated for clarity and with frequency transient variations being shown at the transition points in the carrier between the space and mark frequencies.

Figure 1:
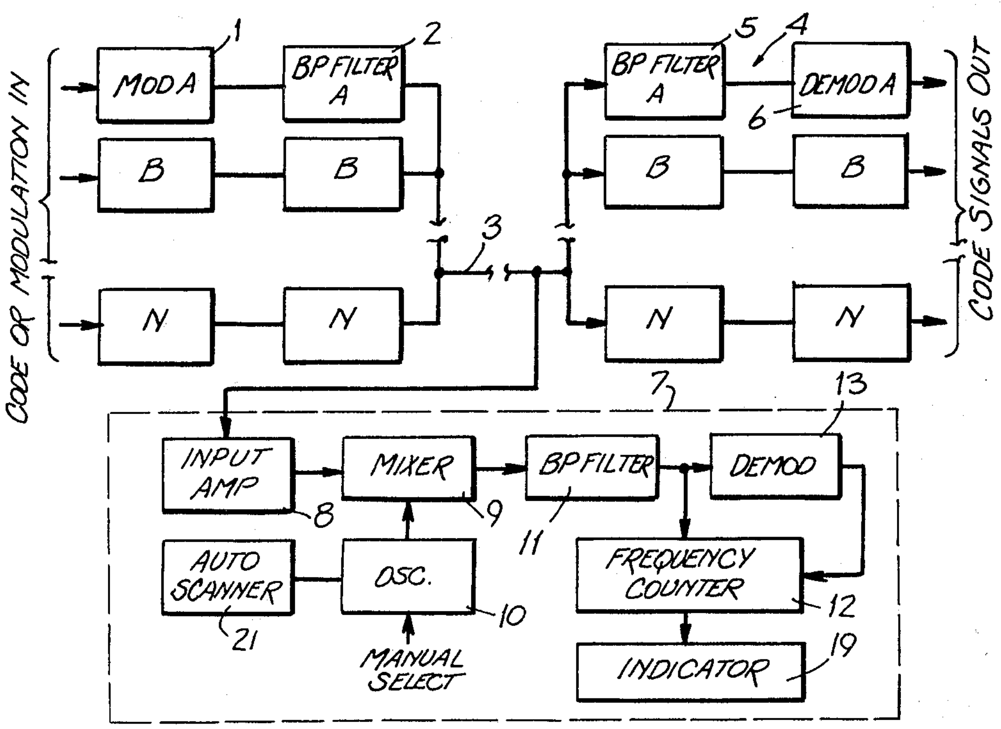
FIG. 1 is a circuit diagram illustrating a preferred embodiment of a means for performing the analyzing method of the present invention on several channels with manual switching.

FIG. 1 illustrates a multi-channel FSK system where several FSK channels are being carried on a single circuit or band with the channels having spaced frequencies. The data or coded signals which are being transmitted are first fed into modulators 1 whose outputs consist of carriers whose frequencies are alternately shifted between preset mark and space frequencies. The out-put signals are now passed through selective band pass filters 2 to the particular circuit 3 being used for transmission to a receiving station 4.

At the receiving station 4, band pass filters 5 are coupled to the circuit 3 to select the channels and to feed each channel to an appropriate demodulator 6 whose output provides the mark and space code signals for recording or other normal use.

A carrier analyzing circuit 7 in accordance with the present invention is shown coupled in a passive manner by isolating resistors or otherwise to the circuit 3. The carrier analyzer 7 comprises an input amplifier 8 which feeds the carrier signals into a mixer circuit 9 and where one of the channels is selected through the use of an adjustable and accurate channel selecting oscillator 10. The mixer 9 output is passed through a band filter 11 set for the intermediate mark and space frequencies. Because of the heterodyning, the intermediate frequency should have the same mark and space values for all channels when the frequencies are correct. The filter 11 output is coupled to a frequency counter 12 and a demodulator 13 which provides a two-level output depending on whether a space or mark frequency is being received. The counter 12 measures the time period for a preset number of signal cycles and thereafter, preferably in the absence of a signal transition, activates a read-out means which gives a time reading which may be calibrated to give the signal frequency variation directly in cycles.

Figure 3:
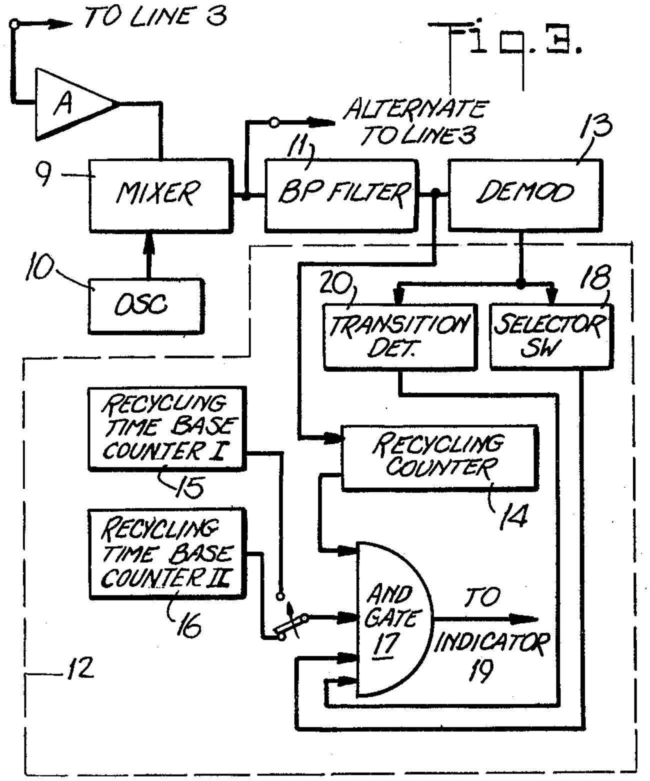
FIG. 3 is a circuit diagram illustrating a preferred embodiment of the analyzing circuit.

A preferred embodiment of the analyzer 7 is illustrated in FIG. 3. As already indicated, a channel selector in the form of a variable and accurate oscillator 10 is calibrated to select a particular channel by heterodyning with the signal on circuit 3 in the mixer 9 to give common intermediate space and mark frequencies for all channels. The common intermediate frequencies are fed through the band pass filter 11 which passes the mark and space frequencies of the intermediate frequency.

The output of the band pass filter 11 is fed to the frequency counter 12. A preferred counting method or means includes a first recycling counter 14 set to recycle after a predetermined number of cycles as, for example, 10 cycles. The counter 14 therefore counts 10 cycles of the signal over and over providing a count-end pulse or signal each time that it reaches 10.

The count-end pulse of the counter 14 is fed to an and gate 17 to pass the output of mark time base counter 15 or a space time base counter 16 to a read-out means 19. The selected time base counters 15 or 16 begin their count with the signal cycle counter 14 and are set to make a predetermined number of counts which would normally cause them to count up to a preset count in the event the actual time period for the 10 cycle sample period was exactly correct. Thus, when the time period is exact and when the time base counter 15 or 16 was set for a time count of 100 during the period, a count of zero would indicate an exact mark or space frequency. If however, the frequency was low, the counter might count to 110. This would give a reading of 10 and would indicate to the operator that the frequency was low by one cycle per second. Correspondingly, if the frequency were too high, the 10 cycle count would be completed too soon and the time base counter may have only counted up to 99. This would give a direct indication to the operator that the frequency was too high by $\frac{1}{10}$ of a cycle per second.

The output of demodulator 13, which is representative of either a space or mark signal, is used to limit the read-out to either the mark or space signal as chosen by time base counters 15 and 16 and also to space the frequency sample from a mark to space transition period to eliminate transition errors. The demodulated signal may thus be coupled through a selector switch or gate 18 which is selectively set to close for either the mark or the space value and to thus provide a signal for the and gate 17 during either the already selected mark or space periods.

A transition detector 20 is also coupled into gate 17. The demodulated signal is also fed into the transition detector 20 and a pulse is generated therein by a signal transition and a gate closing signal is provided a predetermined time delay thereafter. The delay period is set to be longer than the longest 10 cycle signal count which would be involved in the frequency bands being analyzed to insure that that signal count read-out includes no transition errors. The outputs of the mark or space selector switch 18 and the transition detector 20 combine with the count-end pulse from the counter 14 to open the time count output from counters 15 or 16 to the read-out device 19 on either the mark or space signal as selected and in a signal area remote from the signal frequency transitions so that an accurate frequency reading is obtained.

By coupling the oscillator 10 of FIG. 1 to an automatic scanning or tuning device 21, a programmed continuous analysis may be obtained far all signals on a given circuit 3.

It will be seen that an improved method and means is provided for analyzing FSK signals and in particular that a new method and means have been described for a passive analysis of operating FSK circuits where either a manual or a continuous or a programmed sampling of a plurality of FSK channels may be made. The new analyzing system includes means particularly adapted for providing a direct read-out of the frequency shifts in cycles per second independent of the particular channel or carrier frequencies being employed and in addition includes means for isolating the sampled portions of the signals from transitional portions of bit coded messages thereby eliminating transition frequency errors from the results.

A method and means are also described in which the frequency variations are provided in a form suitable for a direct read-out either on visual indicators or on hard copy readers such as teleprinters or other devices.

Having thus described my invention, I claim:

1. A method of measuring frequency variations of a two frequency shift keyed signal normally having predetermined numbers of cycles in predetermined time periods for each of the two frequencies comprising the steps of counting the predetermined number of cycles of one of the signal frequencies, measuring the counting time with a counter, comparing the measured time with the predetermined time period for that frequency, demodulating the signal for setting the counter time base to correspond to one or the other of the signal frequencies being counted.

2. The method as claimed in claim 1 which further comprises the step of forming a control pulse from a frequency transition portion of the demodulated signal for spacing the measuring of the counting time from the said transition portion.

3. A method for measuring frequency variations of a plurality of frequency shift keyed signals normally having predetermined numbers of cycles in predetermined time periods for two frequencies of each signal comprising the steps of forming two common intermediate frequencies for all of the signals, counting a predetermined number of cycles of one of the intermediate signal frequencies, measuring the counting time with a counter, comparing the measured time with the normal time period for that intermediate frequency, demodulating the intermediate frequency signal for setting the counter time base to correspond to one or the other of the intermediate frequencies being counted.

4. The method as claimed in claim 3 which further comprises the step of forming a control pulse from a transition portion of the demodulated signal for spacing the measuring of the counting time from the said transition portion.

5. Means for measuring frequency variations of a two frequency shift keyed signal normally having predetermined numbers of cycles in predetermined time periods for each of the two frequencies comprising means for counting the predetermined number of cycles of one of the signal frequencies, a counter for measuring the counting time, means for comparing the measured time with the predetermined time period for that frequency, means for demodulating the signal for setting the counter time based to correspond to one or the other of the signal frequencies being counted.

6. The means as claimed in claim 5 which further comprises means for forming a control pulse from a frequency transition portion of the demodulated signal, and means activated by said pulse for spacing the measuring of the counting time from the said transition portion.

7. Means for measuring frequency variations of a plurality of frequency shift keyed signals normally having predetermined numbers of cycles in predetermined time periods for two frequencies for each signal comprising means for forming two common intermediate frequencies for all of the signals, means for counting a predetermined number of cycles of one of the intermediate signal frequencies, counting means for measuring the counting time, means for comparing the measured time with the normal time period for that intermediate frequency, means for demodulating the intermediate frequency signal for setting the counter time base to correspond to one or the other of the intermediate frequencies being counted.

8. The means as claimed in claim 7 which further comprises means for forming a control pulse from a transition portion of the demodulated signal and means activated by said pulse for spacing the measuring of the counting time from the said transition portion.

References Cited

UNITED STATES PATENTS 3,267,474 8/1966 Greenlee.

ALFRED E. SMITH, Primary Examiner